United States Patent [19]

Kishi et al.

[11] 3,911,258

[45] Oct. 7, 1975

[54] PULSE INTERPOLATION SYSTEM

[75] Inventors: Hajimu Kishi; Kazushige Momo, both of Tokyo, Japan

[73] Assignee: Oki Electric Industry Co., Ltd., Tokyo, Japan

[22] Filed: June 3, 1974

[21] Appl. No.: 475,852

[30] Foreign Application Priority Data

June 5, 1973   Japan................................. 48-62595

[52] U.S. Cl. ...... 235/151.11; 235/150.31; 235/152; 318/573
[51] Int. Cl.²......................................... G06F 15/46
[58] Field of Search.......... 235/150.31, 151.11, 152; 318/573

[56] References Cited
UNITED STATES PATENTS

| | | |
|---|---|---|
| 3,372,268 | 3/1968 | Hoernes.......................... 235/151.11 |
| 3,591,780 | 7/1971 | Rosenfeld ..................... 235/151.11 X |
| 3,701,890 | 10/1972 | Dummermuth................ 235/150.31 |
| 3,794,900 | 2/1974 | Kobayashi et al. ........ 235/151.11 X |

*Primary Examiner*—Malcolm A. Morrison
*Assistant Examiner*—Jerry Smith
*Attorney, Agent, or Firm*—Kenyon & Kenyon

[57] ABSTRACT

A pulse interpolation system with high speed operation and improved linearity is described. An interpolation pulse train having "one" in all bit places is applied to the axis with the largest incremental command. On the other hand, the interpolation pulses to the other axes are obtained from a basic pulse train which is similar to a pulse train obtained by a prior DDA system. The basic pulse train is modified according to the results of the calculation of the interpolation before being applied to each related axis.

2 Claims, 6 Drawing Figures

PULSE INTERPOLATION SYSTEM

BACKGROUND OF THE INVENTION

The present invention relates to a pulse interpolation system and, in particular, relates to an improved pulse interpolation system which provides many interpolation pulses in a short time with high efficiency.

A pulse interpolation system is utilized in numerical controlled (N.C.) devices, including a positioning system or a contouring control system, and digital X-Y plotter and automatic drawing machine and a graphic display device et al. The interpolation pulses control the driving means, such as a pulse motor, in N.C. devices or X-Y plotter and automatic drawing machine and a graphic display device. In order to obtain rapid operation of N.C. devices or X-Y plotter and automatic drawing machine and a graphic display device, rapid interpolation pulses are necessary.

There have previously been known at least two pulse interpolation systems. One is a DDA (Digital Differential Analyzer) system, in which an adder for the X axis accepts an increment command ΔX and provides the output signal 1 or 0 in accordance with the overflow of the adder from the addition. However, the DDA system has the disadvantage that each addition provides only one interpolation pulse and the operational speed of driving means is fairly slow.

The other prior pulse interpolation system is shown in the article ewntitled, "A Software Interpolation Scheme for Direct Numerical Control", by Donard Wortzman, in "1970 NCS Proceedings Seventh Annual Meeting and Technical Conference". According to this prior art, a desirable pulse train is stored in the tables of a digital memory for every decimal figure and by reading said pulses from said memory, the interpolation pulses are provided. In order to obtain high speed pulses, said tables should have as many as possible "one" (not zero) elements, and for that purpose the following normalization process is performed.

$$\Delta X_2 = \frac{\Delta X_1}{K}$$

$$\Delta Y_2 = \frac{\Delta Y_1}{K}$$

$$n_2 = n_1 K$$

where $\Delta X_1$ is an incremental command for the X axis, $\Delta Y_1$ is an incremental command for the Y axis, $\Delta X_2$ is a normalized incremental command for the X axis, $\Delta Y_2$ is a normalized incremental command for the Y axis, $K$ is a constant, $n_1$ is a number of output pulses for one axis before the normalization and $n_2$ is a number of output pulses for every axis after normalization. Further, a value K must meet the following conditions.

$$\frac{\Delta X_1}{K n_1} < 1.$$

$$\frac{\Delta Y_1}{K n_1} < 1.$$

$$K \leqq 1$$

and the values of the least two significant digits of $K n_1$ must be zero. The process of the above normalization is fairly complicated.

SUMMARY OF THE INVENTION

It is an object, therefore, of the present invention to overcome the disadvantages and limitations of the prior pulse interpolation systems by providing a new and improved pulse interpolation system.

It is also an object of the present invention to provide a new and improved pulse interpolation system with high speed operation and improved linearity.

The above and another objects are attained by a pulse interpolation system comprising the steps of:

selecting $PN_L$ and $PN_s$ from all incremental commands, where $PN_L$ is the largest incremental command, and $PN_s$ is one other than $PN_L$;

multiplying $PN_s$ and $i$ by means of a first multiplier, where $i$ is a number of interpolation pulses obtained in each operational cycle;

dividing said product of $PN_s$ times $i$ by $PN_L$ by means of a first divider;

dividing $PN_L$ by $i$ by means of a second divider;

multiplying $OPN_s$ and $NR_L$ by means of a second multiplier, where $OPN_s$ is a quotient of said first divider, and $NR_L$ is a remainder of said second divider;

dividing the product of $OPN_s$ times $NR_L$ by $i$ by means of a third divider;

adding $AMR_s$ and A by means of an adder, where $AMR_s$ is a remainder of said first divider and A is a remainder of said third divider;

dividing the sum ($AMR_s + A$) by $i$ by means of a fourth divider;

comparing AM with N, where AM is a quotient of said fourth divider and N is a quotient of said second divider;

providing a basic pulse train according to said values of $OPN_s$ and $i$;

adding a value of AM in a variable capacity register if N is equal to or larger than AM according to said comparison;

adding a value of (AM−1) in a variable capacity register if N is smaller than AM according to said comparison, where the capacity of the variable capacity register is equal to N;

modifying said basic pulse train by inserting "one" in said pulse train by an overflow pulse of said variable capacity register;

providing a pulse train having one in all bit places to an axis with the largest incremental command as interpolation pulses, and;

providing said modified basic pulse train to the corresponding axis as interpolation pulses.

BRIEF EXPLANATION OF THE DRAWINGS

FIG. 4 is another example of a pair of pulse trains according to the present invention.

PREFERRED EMBODIMENTS

Figure 1A:
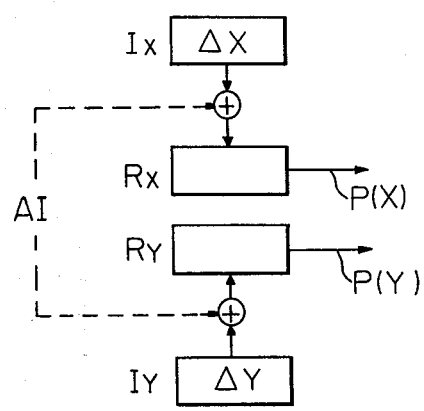
FIG. 1(A) is a block diagram of a prior DDA system.
Figure 1B:
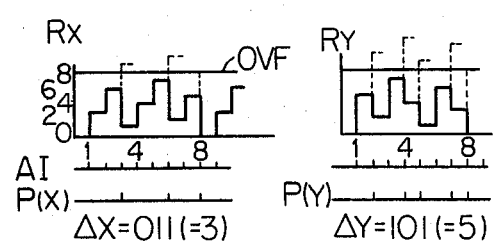
FIG. 1(B) is an explanatory drawing of FIG. 1(A)

FIG. 1(A) shows a block diagram of a prior DDA (Digital Differential Analyzer). In FIG. 1(A), an incremental command ΔX (or ΔY) is stored in a register $I_X$ (or $I_Y$) as an adder, and the command is accumulated in a register $R_X$ (or $R_Y$) each time the addition command AI is applied. If an overflow occurs in the register $R_X$ (or $R_Y$) due to the addition, an interpolation pulsel P(X) or P(Y) is obtained from the register $R_X$ (or $R_Y$). FIG. 1(B) shows the operation of FIG. 1(A). It is assumed that registers $I_X$ and $I_Y$, and accumulators $R_X$ and $R_Y$ have three bits respectively, and that incremental commands ΔX and ΔY are 011 and 101, respectively. The accumulator $R_X$ or $R_Y$ overflows each time its content reaches eight, and an interpolation pulse P(X) or P(Y) is obtained as shown in FIG. 1(B). Through above operation, three interpolation pulses P(X) and five interpolation pulses P(Y) are obtained. However, as mentioned above, the DDA system has a disadvantage that only one interpolation pulse is obtained by each addition.

Figure 2:
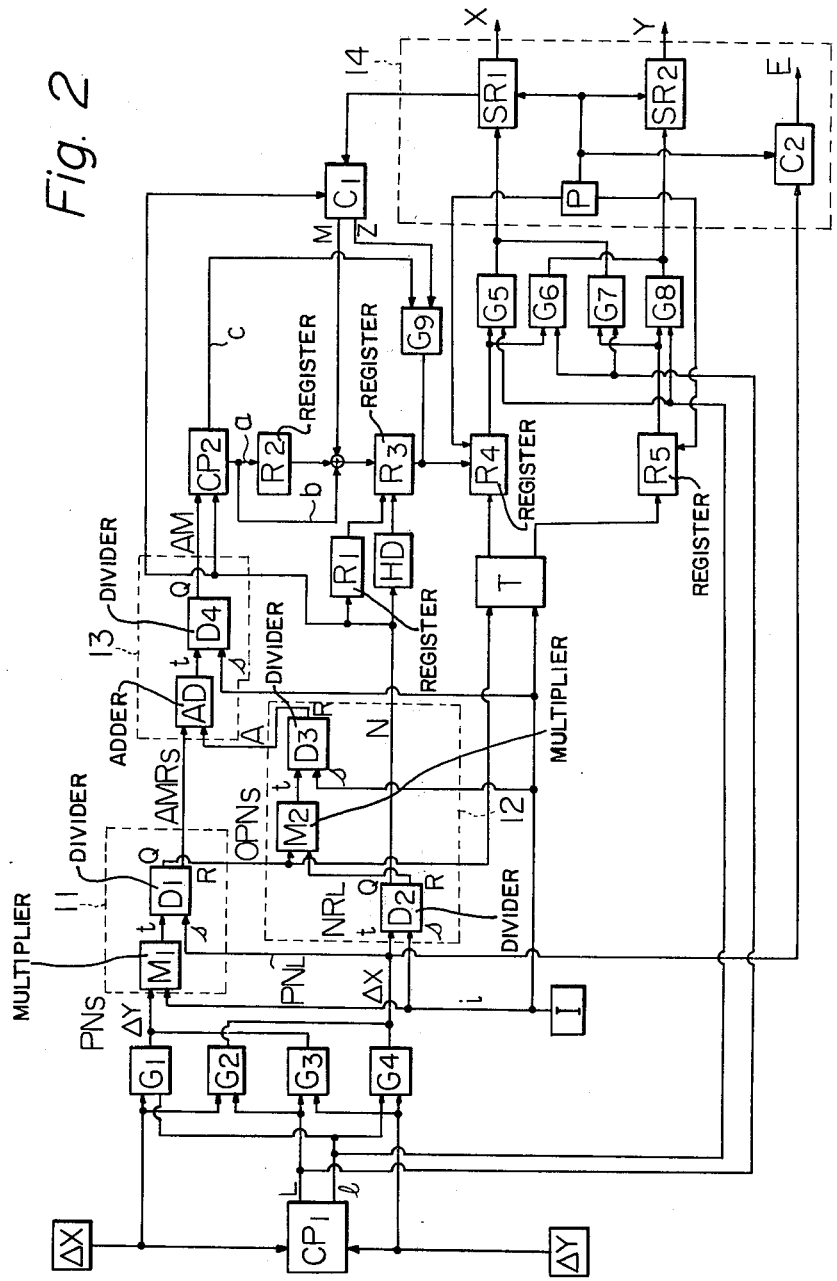
FIG. 2 is a block diagram of a pulse interpolation system according to the present invention.

FIG. 2 shows a block diagram of a pulse interpolation system according to the present invention, which overcomes the disadvantages of the prior arts. In FIG. 2, $CP_1$ and $CP_2$ are comparators; $G_1$, $G_2$, $G_3$, $G_4$, $G_5$, $G_6$, $G_7$, $G_8$ and $G_9$ are AND circuits; $M_1$ and $M_2$ are multipliers; $D_1$, $D_2$, $D_3$ and $D_4$ are dividers; HD is a half multiplier; T is a converter; $R_1$, $R_2$, $R_3$, $R_4$ and $R_5$ are registers; P is a feed-pulse generator; $SR_1$ and $SR_2$ are shift registers; $C_1$ and $C_2$ are counters; I is a reference signal generator, the content i of which defines a number of output pulses obtained in one operational cycle; AD is an adder, and; ΔX and ΔY are values of incremental commands.

The operation of the apparatus of FIG. 2 will now be explained. For the sake of simplicity of the explanation, a numerical embodiment wherein ΔX = 23, ΔY = 20 and i = 10, is explained with the following operational explanation.

The comparator $CP_1$ compares a value of ΔX with a value of ΔY, and provides an output signal on a line L when the value of ΔX is larger than or equal to the value of ΔY, or provides an output signal on a line l when the value of ΔX is smaller than the value of ΔY. The line L is connected to the inputs of AND circuits $G_2$, $G_3$, $G_6$ and $G_7$, and the line l is connected to the inputs of ANd circuits $G_1$, $G_4$, $G_5$ and $G_8$. These AND circuits are opened when a signal on the line L or line l is provided. Accordingly, if ΔX ≧ ΔY, a larger incremental value ΔX is applied through the ANd circuit $G_2$ to a first divider $D_1$ as a divisor s, a second divider $D_2$ as a dividend t, and a counter $C_2$ as a preset number. A smaller incremental value ΔY is applied to an input of a first multiplier $M_1$ through the AND circuit $G_3$. On the other hand, if ΔX<ΔY, a larger incremental value ΔY is applied through the AND circuit $G_4$ to the first divider $D_1$ as the divisor s, and the second divider $D_2$ as the dividend t, and the counter $C_2$ as a preset number, and a smaller incremental value ΔX is applied to an input of the first multiplier $M_1$ through the AND circuit $G_1$. The dividers $D_1$, $D_2$, $D_3$ and $D_4$ are integer type dividers, each of which receives a dividend at an input t and a divisor at an input s and provides a quotient at an output Q and a remainder at an output R.

In the present embodiment, since ΔX is 23 and ΔY = 20, ΔX is larger than ΔY (ΔX ≧ ΔY). Accordingly, the second divider $D_2$ receives the larger incremental command $PN_L$ ( = ΔX = 23) as a dividend at the input t, and i ( = 10) as a divisor at the input s, and performs the division $$\frac{\Delta X}{i} ( = \frac{23}{10} ),$$

and provides a quotient N ( = 2) at an output Q and a remainder $NR_L$ ( = 3) at an output R. Said quotient N ( = 2) is applied to a half multiplier HD which provides an output (1) which is half of an input (2) to a register $R_3$ for pre-setting the same to 1/2 N ( = 1). Said quotient N is also applied to a register $R_1$ and a counter $C_1$ for pre-setting them to N ( = 2), and one input of a comparator $CP_2$. The half multiplier HD works for improving the accuracy of the interpolation. The remainder $NR_L$ ( = 3) at the output R of said second divider $D_2$ is applied to the first input of the second multiplier $M_2$. A smaller incremental command value $PN_S$ ( = ΔY = 20) is applied to the first input of the first multiplier $M_1$ through the AND circuit $G_1$. The second input of said first multiplier $M_1$ is supplied the value of i ( = 10) from the reference signal generator I. The first multiplier $M_1$ performs the multiplication ΔY times i ( = 20 × 10), and its product ( = 200) is applied to the input t of the first divider $D_1$ as a dividend. The first multiplier $M_1$ and the first divider $D_1$ compose the first arithmetic means 11. The first divider $D_1$ performs the division $$\frac{(\Delta Y \times i)}{\Delta X} ( = \frac{(20 \times 10)}{23} ).$$

The quotient $OPN_S$ ( = 8) of said division is applied to the first input of the second multiplier $M_2$ and the first input of the converter T from the output Q of said first divider $D_1$. The remainder $AMR_S$ ( = 16) of said division is applied to the first input of the adder AD from the output R of said first divider $D_1$. The second multiplier $M_2$ receives the quotient $OPN_S$ ( = 8) from the first divider $D_1$ and the remainder $NR_L$ ( = 3) from the second divider $D_2$, and performs the multiplication $OPN_S$ times $NR_L$ ( = 8 × 3 = 24). The product of said multiplication is supplied as a dividend to the third divider $D_3$, which receives also the divisor i from the reference signal generator I. The third divider $D_3$ performs the division $$\frac{(OPN_S \times NR_L)}{i} ( = \frac{(8 \times 3)}{10} ),$$

and its remainder A ( = 4) is applied to the second input of the adder AD from the output R of the divider $D_3$. The dividers $D_2$, $D_3$ and the multiplier $M_2$ compose the second arithmetic means 12.

The adder AD receives the remainder $AMR_S$ ( = 16) from the first divider $D_1$ and the remainder A ( = 4) from the third divider $D_3$, and performs the addition $AMR_S$ plus A ( = 16 + 4 = 20). The sum ( = 20) of said addition is applied as a dividend to the fourth divider $D_4$, which receives the divisor i from the reference signal generator I. The quotient AM ( = 2) of the division by said fourth divider $D_4$ is applied to the second input of the comparator $CP_2$. Said adder AD and the divider $D_4$ compose the third arithmetic means 13.

The converter T provides one of the following pulse trains according to the input signal from the divider $D_1$ on the condition that the value of i from the reference signal generator I is 10.

| Input to the Converter T | Output pulse trains from the Converter T Bit Number | | | | | | | | | |
|---|---|---|---|---|---|---|---|---|---|---|
| | 1 | 2 | 3 | 4 | 5 | 6 | 7 | 8 | 9 | 10 |
| 0 | 0 | 0 | 0 | 0 | 0 | 0 | 0 | 0 | 0 | 0 |
| 1 | 0 | 0 | 0 | 0 | 0 | 0 | 0 | 0 | 0 | 1 |
| 2 | 0 | 0 | 0 | 0 | 1 | 0 | 0 | 0 | 0 | 1 |
| 3 | 0 | 0 | 0 | 1 | 0 | 0 | 1 | 0 | 0 | 1 |
| 4 | 0 | 0 | 1 | 0 | 1 | 0 | 0 | 1 | 0 | 1 |
| 5 | 0 | 1 | 0 | 1 | 0 | 1 | 0 | 1 | 0 | 1 |
| 6 | 0 | 1 | 0 | 1 | 1 | 0 | 1 | 0 | 1 | 1 |
| 7 | 0 | 1 | 1 | 0 | 1 | 1 | 0 | 1 | 1 | 1 |
| 8 | 0 | 1 | 1 | 1 | 1 | 0 | 1 | 1 | 1 | 1 |
| 9 | 0 | 1 | 1 | 1 | 1 | 1 | 1 | 1 | 1 | 1 |
| 10 | 1 | 1 | 1 | 1 | 1 | 1 | 1 | 1 | 1 | 1 |

The pulse trains in above table are the same as a series of overflow pulses from an accumulator which adds an input number to the content of itself and produces an overflow pulse every time its content exceeds the predetermined number $i$ ( = 10). That is to say, the converter T provides parallelly the same pulse trains as those from a conventional DDA (Digital Differential Analyzer). In the present embodiment, since the value of $i$ is 10 and an input number to the converter which is the same as a quotient $OPN_S$ of the divider $D_1$ is 8, the converter T outputs a pulse train (0 1 1 1 1 0 1 1 1 1) according to the above table, and the output pulse train from the converter T is stored in a register $R_4$. The pulse train stored in the register $R_4$ is called a basic pulse train B. On the other hand, a register $R_5$ stores a series of pulse train, all bits of which are one, and the bit length of the register $R_5$ is defined by the value of $i$ ( = 10). In the present embodiment, the content of the register $R_5$ is ( 1 1 1 1 1 1 1 1 1 1 ).

The comparator $CP_2$ receives two inputs, one is a quotient AM from the fourth divider $D_4$ and the other is a quotient N from the second divider $D_2$, and according to the result of the comparison of the two inputs, it operates as follows.

a. When $N \geq AM$, and $N \neq 0$.

In this case, (1) a value of AM is pre-set in the register $R_2$ through a line $a$, (2) the content of said register $R_2$ after the above pre-setting is added by the control through a line $b$, to the content of the register $R_3$, whose initial content is equal to the output of the half multiplier HD, and (3) through a line $c$, an AND circuit $G_9$ is provided a "zero" input.

b. When $N < AM$, and $N \neq 0$,

In this case, (1) a value of (AM − 1) is pre-set in the register $R_2$ through the line $a$, (2) the content of said register $R_2$ after the above pre-setting is added to the content of the register $R_3$, and (3) through the line $c$, the AND circuit $G_9$ is provided a one input.

c. When $N = 0$,

In this case, (1) the register $R_2$ is not loaded, in other words, the content of the register $R_2$ becomes zero, and (2) the AND circuit $G_9$ is provided a one input.

The register $R_3$ is a variable capacity register, whose capacity is equal to the content of the register $R_1$, and after adding the content of the register $R_2$ and the register $R_3$, the register $R_3$ provides an overflow pulse when the result of the addition of the registers $R_2$ and $R_3$ exceeds said capacity ( = content of the register $R_1$) defined by the register $R_1$. When the register $R_3$ overflows, the content of the first bit of the register $R_4$ is changed to one, otherwise it is not changed.

In the present embodiment, the value of AM is 2, and the value of N is 2, consequently, AM is equal to N ($AM = N$). The initial value of the register $R_3$ is 1 (which is the same as the content of the half multiplier HD), and the capacity of the register $R_3$ is 2 (which is the same as the content of the register $R_1$). Therefore, according to item (a) above, the register $R_2$ is loaded with the value of AM ( =2), which is added to the content of the register $R_3$, the sum of which is 3 ( = 1 + 2). Since the capacity of the register $R_3$ is only 2, the register $R_3$ overflows, and provides an overflow pulse. The content of the register $R_3$ after the overflow is 1 ( = 3 − 2). Since the register $R_3$ overflows, the first bit of the register $R_4$ is changed to 1 and, thus, the content of the register $R_4$ becomes ( 1 1 1 1 1 0 1 1 1 ), although the original content of the same is ( 0 1 1 1 1 0 1 1 1 ).

The contents of the registers $R_4$ and $R_5$ are transferred to shift registers $SR_1$ and $SR_2$ through AND circuits $G_5$ and $G_8$, or through ANd circuits $G_6$ and $G_7$. In the present embodiment, since $\Delta X$ is larger than $\Delta Y$, the comparator $CP_1$ opens AND circuits $G_6$ and $G_7$. Accordingly, the content of the register $R_4$ is transferred to the shift register $SR_2$, and the content of the register $R_5$ is transferred to the shift register $SR_1$. When said transfer is completed, the content of the counter $C_1$ (whose initial content is 2), is reduced by one. At this time, the contents of the shift registers $SR_1$ and $SR_2$ are ( 1 1 1 1 1 1 1 1 1 1 ) and ( 1 1 1 1 1 0 1 1 1 1 ), respectively.

The feed pulse generator P causes the shift register $SR_1$ to send a series of interpolation pulses for the X axis, and the shift register $SR_2$ for the Y axis. When all pulses stored in shift registers $SR_1$ and $SR_2$ have beenn sent to the X and Y axes, the feed pulse generator P causes the registers $R_4$ and $R_5$ to transfer their contents to shift registers $SR_2$ and $SR_1$ through AND circuits $G_5$ through $G_8$. At the same time, the feed pulse generator P applies a feed pulse to the counter $C_2$ (whose initial content is 23) causing a reduction of the content of the counter $C_2$ by one. The above operation is repeated until the content of the counter $C_2$ reaches zero. When the content of the counter $C_2$ reaches zero, the counter $C_2$ provides an end signal E, which causes the termination of the pulse interpolation operation of the present system. It is apparent from the above explanation that the interpolation pulses ( 1 1 1 1 1 1 1 1 1 1 ) are sent to the X axis and the interpolation pulses ( 1 1 1 1 1 0 1 1 1 1 ) are sent to the Y axis during the first operational cycle.

Next, the operation of the counter $C_1$ is explained. The counter $C_1$ is initially loaded with the quotient N of the second divider $D_2$. According to a value of N, the counter $C_1$ works as follows.

a. When N is zero, a signal is applied from the output terminal Z of the counter $C_1$ to the AND circuit $G_9$. Since the comparator $CP_2$ applies a signal to the AND circuit $G_9$ as explained before, in case of $N = 0$, the AND circuit $G_9$ provides an output signal to the register $R_4$. The output signal from the AND circuit $G_9$ causes the register $R_4$ to change the first bit of the register $R_4$ to one.

b. When N is not zero, the counter $C_1$ provides no output signal.

As explained before, the content of the counter $C_1$ is reduced by one when the data transfer from thhe registers $R_4$ and $R_5$ to the shift registers $SR_1$ and $SR_2$ is completed. According to the content ($C_1$) of the counter $C_1$ after said reduction, the counter $C_1$ works as follows.

a. When ($C_1$) is not zero, ($C_1$) ≠ 0, a command for addition is applied from the output terminal M of the counter $C_1$ to the register $R_3$, and the content of the register $R_2$ is added to the content of the register $R_3$. If an overflow occurs as a result of that addition in the register $R_3$, the first bit of the register $R_4$ is changed to one, otherwise it remains zero, as explained before.

b. When ($C_1$) is zero, ($C_1$) = 0, no addition is performed, but a signal is provided to the AND circuit $G_9$ from the output terminal Z of the counter $C_1$. Therefore, if the comparator $CP_2$ is applying a signal to the AND circuit $G_9$, said AND circuit $G_9$ provides an output signal, which changes the first bit in the register $R_4$ to one, otherwise said first bit remains zero.

In the present embodiment ($\Delta X = 23$, $\Delta Y = 20$), the interpolation pulses obtained from the shift registers $SR_1$ and $SR_2$ are as follows.

1. In the first operational cycle, the interpolation pulses for the X axis and the Y axis are ( 1 1 1 1 1 1 1 1 1 ) and ( 1 1 1 1 1 0 1 1 1 1 ), respectively, as explained before.

2. In the second operational cycle, the interpolation pulses for the X axis and the Y axis are ( 1 1 1 1 1 1 1 1 1 ) and ( 1 1 1 1 1 0 1 1 1 1 ), respectively. The reason for this is that after the reduction the content of the counter $C_1$ is one and not zero.

Therefore, the content of the register $R_2$ ( = 2) is added to the content of the register $R_3$ (whose initial content is 1), according to the above item (a) and an overflow occurs since the capacity of the register $R_3$ is only 2. Then, the first bit of the register $R_4$, whose original content is ( 0 1 1 1 1 0 1 1 1 1 ) from the above table, is changed to one and, thus, the content of the register $R_4$ becomes ( 1 1 1 1 1 0 1 1 1 1 ). On the other hand, the register $R_5$ is loaded with ( 1 1 1 1 1 1 1 1 1 1 ) by the reference signal generator I through the converter T.

3. In the third operational cycle, the interpolation pulses for the X axis and the Y axis are ( 1 1 1 ) and ( 0 1 1 ), respectivecley. In this cycle, the content of the counter $C_1$ after the reduction is zero, and the counter $C_1$ applies a signal to the AND circuit $G_9$. However, the comparator $CP_2$ does not apply a signal to the AND circuit $G_9$, since both the quotients AM and N are 2 and equal each other. Therefore, the AND circuit $G_9$ does not provide an output signal, and the first bit of the register $R_4$ is not changed. Thus, the content of the register $R_4$ remains ( 0 1 1 1 1 0 1 1 1 1 ). On the other hand, the content of the register $R_5$ is ( 1 1 1 1 1 1 1 1 1 1 ). When the first three bits ( 1 1 1 ) and ( 0 1 1 ) are transferred as interpolation pulses from the shift registers $SR_1$ and $SR_2$ to the corresponding axis, the content of the counter $C_2$ reaches zero and the pulse interpolation operation is terminated.

Figures 3A, 3B:
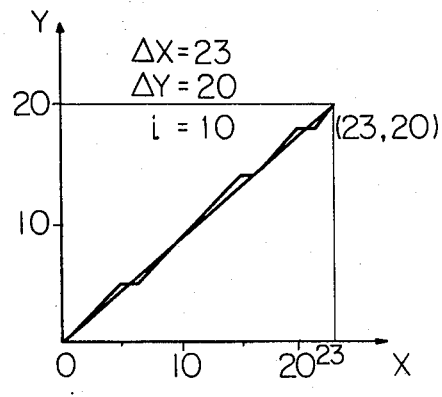
FIG. 3(A) and FIG. 3(B) are an exemplary curve and a pair of interpolation pulse trains, respectively, according to the apparatus of FIG. 2.

FIG. 3(A) shows a curve of a moving path of, for instance, a bit of a numerical control machine, where $\Delta X = 23$, $\Delta Y = 20$ and $i = 10$. FIG. 3(B) shows the pulse trains for the X axis and the Y axis on the same condition as above. As apparent from FIGS. 3(A) and 3(B), interpolation pulses are applied without interruption to the X axis which is given the larger command. (That is to say, the output signal to the X axis is one in all bit places in this embodiment.). Accordingly, the present invention improves interpolation speed and the linearity of a moving path.

FIG. 4 shows another embodiment of pulse trains where $\Delta X > \Delta Y$, AM ≦ N, $i = 10$ and B (the number of pulses in a cycle in a basic pulse train) is 7.

Although, the embodiment having only two axes is explained above, the present invention is applicable to the interpolation system having more than three axes. When the system has more than three axes, the divider $D_2$ should be supplied the largest incremental command as a dividend.

Most of the parts of the device shown in FIG. 2 can be replaced by a general purpose computer having appropriate software. In that case, a simple peripheral circuit 14 having the shift registers $SR_1$ and $SR_2$, a feed pulse generator P, and a counter $C_2$ need only be connected to the programmed computer.

As is apparent from the above explanation, the present invention has a particular advantage in that many interpolation pulses with high speed can be obtained in a short time. Therefore, the present invention is applicable to a CNC (Computer NC) system, a numerical controlled machine tool with high speed operation, and the interpolation system between two points such as a X-Y plottere, and automatic drawing machine and a graphic display device. Since one particular axis is always provided with interpolation pulses according to the present invention, the present invention is very useful for those systems having another axis which operates in a corresponding manner to said particular axis, such as a numerical controlled screw cutter.

From the foregoing, it will now be apparent that a new and improved pulse interpolation system has been found. It should be understood, of course, that the embodiments disclosed are merely illustrative and are not intended to limit the scope of the invention. Reference should be made to the following claims for an indication of the scope of the invention.

Finally, the major reference numbers and symbols used herein are listed below.

| | |
|---|---|
| $CP_1$, $CP_2$, | Comparator |
| $G_1$~$G_9$, | AND circuit |
| $M_1$, $M_2$, | multiplier |
| $D_1$~$D_4$, | divider |
| HD, | half multiplier |
| T, | converter |
| $R_1$~$R_5$, | register |
| P, | feed pulse generator |
| $SR_1$, $SR_2$, | Shift register |
| $C_1$, $C_2$, | Counter |
| I, | reference signal generator |
| $\Delta X$, $\Delta Y$, | incremental command |
| AD, | adder |
| 11, | first arithmetic means |
| 12, | second arithmetic means |
| 13, | third arithmetic means |
| 14, | peripheral circuit |

What is claimed is:
1. A pulse interpolation system comprising:
   a. a first arithmetic means having a first multiplier for the multiplication i times PNs, and a first divider for the division of the product ($i$·PNs) of said multiplication by $PN_L$, where i is an integer representing a number of pulses to be interpolated in one operational cycle, PNs is an integer representing an incremental command for the axis other than that having the largest incremental command, and $PN_L$ is an integer representing the largest incremental command;

b. a second arithmetic means having a second divider for the division $PN_L/i$, a second multiplier for the multiplication OPNs times $NR_L$, and a third divider for the division of the product of said second multiplier by $i$, where OPNs is a quotient of said first divider and $NR_L$ is a remainder of said second divider;

c. a third arithmetic means having an adder for AMRs plus A, and a fourth divider for the division of the sum of said adder by $i$, where AMRs is a remainder of said first divider and A is a remainder of said third divider;

d. a variable capacity register with capacity N where N is a quotient of said second divider;

e. a converter for obtaining the particular basic pulse train defined by the value of OPNs, and for changing a value of $i$ to a pulse train having one in all bit places;

f. means for adding a value of AM in said variable capacity register if N is equal to or larger than AM, and adding a value of (AM-1) in the same if N is smaller than AM, where AM is a quotient of said fourth divider, and N is a quotient of said second divider;

g. means for modifying said basic pulse train by inserting a pulse in said basic pulse train according to an overflow pulse from said variable capacity register due to said addition;

h. means for providing said modified pulse train to the related axis and a pulse train having one in all bit places to the axis of the largest incremental command, and;

i. counter for counting the output interpolation pulses for terminating the operation of the present system.

2. A method for providing an interpolation pulse comprising the steps of:

a. selecting $PN_L$ and PNs from all incremental commands where $PN_L$ is the largest incremental command, and PNs is one other than $PN_L$;

b. multiplying PNs and $i$ by means of a first multiplier, where $i$ is a number of interpolation pulses obtained in each operational cycle;

c. dividing said product PNs x $i$ by $PN_L$ by means of a first divider;

d. dividing $PN_L$ by $i$ by means of a second divider;

e. multiplying OPNs and $NR_L$ by means of a second multiplier, where OPNs is a quotient of said first divider, and $NR_L$ is a remainder of said second divider;

f. dividing the product OPNs $\times NR_L$ by $i$ by means of a third divider;

g. adding AMRs and A by means of an adder, where AMRs is remainder of said first divider and A is a remainder of said third divider;

h. dividing the sum (AMRs + A) by $i$ means of a fourth divider;

i. comparing AM with N, where AM is a quotient of said fourth divider and N is a quotient of said second divider;

j. providing a basic pulse train according to said values of OPNs and $i$;

k. adding a value of AM in a variable capacity register if N is equal to or larger than AM according to said comparison;

l. adding a value of (AM-1) in a variable capacity register if N is smaller than AM according to said comparison, where the capacity of the variable capacity register is equal to N;

m. modifying said basic pulse train by inserting one in said pulse train by an overflow pulse of said variable capacity register;

n. providing a pulse train having one in all bit places to an axis with the largest incremental command as interpolation pulses;

o. providing said modified basic pulse train to its corresponding axis as interpolation pulses, and;

p. counting the number of pulses from a feed pulse generator for terminating the operation of the pulse interpolation system.

* * * * *